Dec. 15, 1925.  1,566,165
W. G. O'BRIEN
METHOD OF MAKING ARTICLES FROM RUBBERIZED FIBER COMPOSITION
Filed July 31, 1922
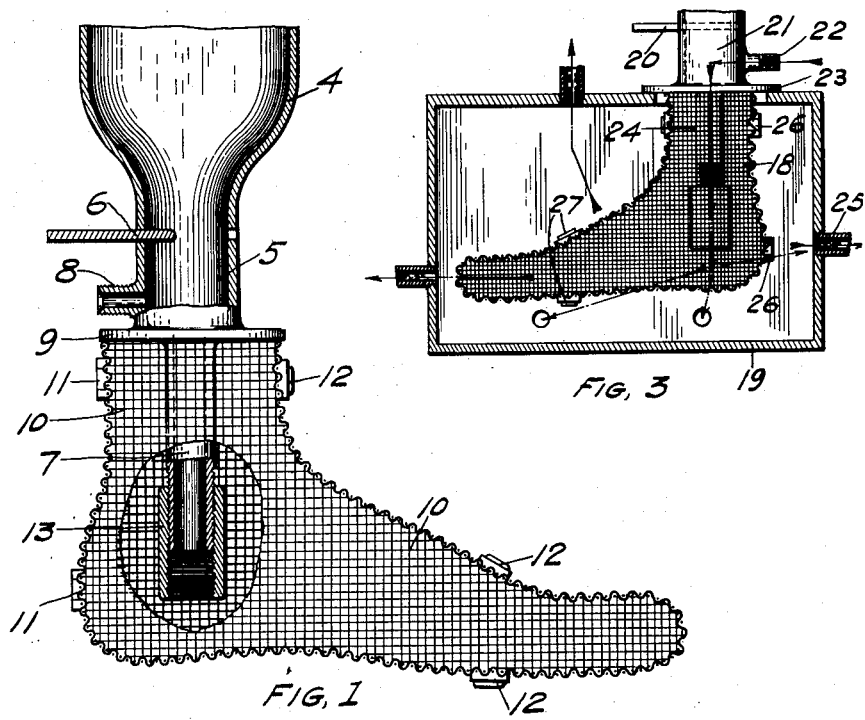
FIG. 1
FIG. 3
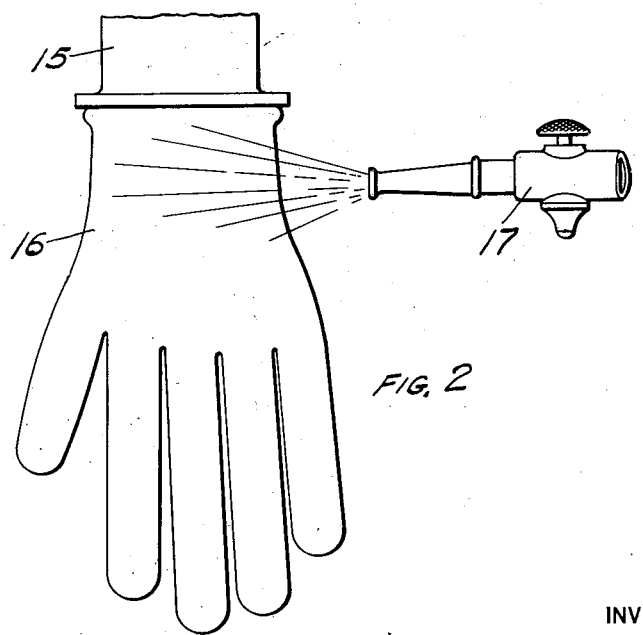
FIG. 2
INVENTOR
WILLIAM. G. O'BRIEN
BY
ATTORNEY Patented Dec. 15, 1925.

1,566,165

UNITED STATES PATENT OFFICE.

WILLIAM G. O'BRIEN, OF AKRON, OHIO, ASSIGNOR TO THE GOODYEAR TIRE & RUBBER COMPANY, OF AKRON, OHIO, A CORPORATION OF OHIO.

METHOD OF MAKING ARTICLES FROM RUBBERIZED-FIBER COMPOSITION.

Application filed July 31, 1922. Serial No. 578,743.

*To all whom it may concern:*

Be it known that I, WILLIAM G. O'BRIEN, a citizen of the United States, and resident of Akron, Ohio, have invented new and useful Improvements in Methods of Making Articles from Rubberized-Fiber Composition, of which the following is a specification.

My invention relates to a method of making a rubberized fiber composition, which may be utilized in a variety of capacities, such as for floor or wall coverings, as a substitute for leather, or for any other purpose to which a tough flexible, porous, water-resistant composition may be adapted. More particularly, my invention relates to a method of making articles from the material designated, and molded to the exact contour of the finished product.

The object of my invention is to provide a novel method of making molded articles, in which rubberized fiber composition may be deposited as desired in an integral layer which conforms with the contour of the finished product.

Heretofore it has been customary in the construction of articles manufactured from rubberized fibers to make the material in sheets, and to subsequently cut and form the material into the desired article by sewing, cementing, or otherwise fastening the pieces together. While this method has proven satisfactory in the past, it is obvious that there is considerable waste in cutting the flat material and considerable labor in forming and sewing the flat material into the shape of the desired product, which may be of very irregular contour.

By my invention I have eliminated the waste incident to cutting the flat sheets of material, and also the labor incident to the formation of the finished article from the flat material. I have also provided a method whereby the finished article is made integral. This results in a stronger and neater construction than the customary overlapped sewed or vulcanized articles.

In the accompanying drawings; Fig. 1 is a side elevational view, partially in section, of a machine adapted for use in connection with my invention. Fig. 2 is a side elevational view illustrating another form which my invention may assume. Fig. 3 is a sectional view of an apparatus for practising a modified form of my invention.

Carrying out my invention, I suspend a quantity of fibers in a suitable amount of liquid which consists of a mixture of a rubber solvent and a rubber precipitant. Although I prefer the use of toluol as a rubber solvent, benzol, gasoline or the like may equally well be employed. As a precipitant, I prefer to use alcohol, acetone or any other rubber precipitant which is miscible with the solvent that may be used. Ordinarily I prefer employing the solution in approximately the proportions of 77% toluol and 23% alcohol, which constitutes a precipitating liquid at normal room temperature. The fibers employed may be of cotton, wool, jute, hemp, asbestos, leather or any other suitable material, the particular fiber used depending upon the service in which the finished product is ultimately intended to be employed.

After the fiber is thoroughly mixed with the liquid, a quantity of rubber in solution in toluol is added thereto and thoroughly mixed therewith. The rubber is precipitated upon the fibers, by reason of the fact that the mixture to which the rubber is added is a precipitant. I have found that it is desirable to employ approximately equal amounts, by weight, of rubber and fiber, each of which should be approximately $\frac{1}{2}\%$ to 2% of the weight of the toluol-alcohol mixture.

After the fibers have been coated with rubber, they form a fibrous pulpy mass. Referring to Fig. 1 of the drawing, the mass may be disposed in a container 4, having an extension 5, which is provided with a valve 6, adapted to permit the escape of the pulp into pipe 7, when opened. The depending portion 5 is also provided, below the valve 6, with a gas connection 8. Surrounding the pipe 7, is a flange 9, upon which may be mounted a foraminous mold 10, of any desired contour, in Fig. 1 the contour being that of a shoe. The mold 10 is hinged along one side by means of hinges 11, and is adapted to be separated along the opposite edges for removal of the molded product, the two hinged parts being held in closed position by means of latches 12 along the open edges.

The rubber coated fiber pulp is admitted to the mold 10 by opening the valve 6, until a suitable quantity thereof has passed through, whereupon the valve 6 is closed.

The pulp passes through the pipe 7 and is deposited in a mass upon the bottom of the screen mold 10. Compressed air is now admitted through the connection 8, which strikes the mass of fibers and causes them to distribute themselves upon the inside surface of the screen mold 10. The thickness of the coating of the material upon the various portions of the section, is regulated by the shape and height of the opening of the pipe 7. The lower portion of the pipe 7 is provided with a member 13 in threaded engagement therewith, the height of which may be adjusted to produce different results. The member 13 may be of any desired shape depending upon the article to be formed and the relative thicknesses of the various portions thereof.

The compressed air forces any moisture which may remain in the fibers through the screen, thus making the material comparatively dry. Heated air may now be admitted through the connection 8, the heat and pressure thereof serving as a vulcanizing medium of the rubber on the fibers. The product is then removed from the mold by opening the latches 12 and separating the two portions of the mold, the molded article being disposed therein in the finally desired contour. If desired, the compressed air used for drying the fibers may be heated so as to combine the drying and curing process. After the fiber has been deposited upon the inside of the screen, the curing action may be effected by first introducing sulphur dioxide and, subsequently, hydrogen sulphide through the gas connection 8, drying being effected by later admitting hot air thereto.

The curing of the rubber may also be effected while the rubber is in solution, prior to being deposited upon the fibers, or after being deposited upon the fibers and while still suspended in the toluol-alcohol mixture, by means of treatment with, first the sulphur dioxide, and subsequently, the hydrogen sulphide. The fibers coated with the treated rubber are then strained from the liquid, and may be used in the machine, illustrated in Fig. 1, as has already been described, with the exception that the usual curing process may be omitted from the course of treatment.

Also, my invention contemplates depositing the rubber coated fibers upon any type of mold, by means of a compressed-air gun, or any other suitable device which throws the fibers against the mold, and which may be manipulated, preferably by hand. This form of my invention is illustrated in Fig. 2 in which I show a supporting member 15, upon which is mounted a mold 16, in the shape of a hand or glove. The rubber coated fibers are deposited thereon by means of a gun 17. This gun is charged with compressed air and carries therewith a quantity of the rubber coated fibers. When this method of making articles is employed, I prefer that the rubber particles be treated with the sulphur dioxide and hydrogen sulphide prior to admitting them to the gun 17, in accordance with the method of curing already described.

Instead of using compressed air in an open mold, as illustrated in Fig. 1, I may employ, as illustrated in Fig. 3, a porous mold 18, disposed within an evacuated container 19. In using this apparatus the fibrous pulp is admitted through a valve 20 into a lowermost portion 21 of a fiber container. The portion 21 is provided with an air inlet duct 22 and with a supporting flange 23, which engages the wall of the container 19 with a sealing engagement. The supporting flange 23 of the member 21 is provided with a depending extension or pipe 24, through which the pulpy mass passes to the bottom of the foraminous mold 18. After the pulp is deposited in the mold 18, the air is drawn from the container 19, through ducts 25, and is admitted, through the gas connection 22, to the portion 21 in the pulp container. This movement of the air causes the pulp to be distributed evenly over the surface of the screen mold, as described in connection with Fig. 1.

The mold must be removed from the container 19, and the two portions thereof, which are held together by means of hinges 26 and latches 27, must be separated in order to remove the product from the inside of the screen mold.

Although I have illustrated several forms of my invention, and have specifically described several applications thereof, it will be apparent to those skilled in the art that it is not so limited but that various minor modifications and changes may be made therein without departing from the spirit of my invention, and I desire therefore to be limited only by the scope of the appended claims.

What I claim is:

1. The method of treating fibers which comprises coating the fibers with rubber, depositing the coated fibers on a porous mold, and drying the product.

2. The method of treating fibers which comprises coating the fibers with rubber, depositing the coated fibers on a porous mold by means of compressed air, and drying the product.

3. The method of treating fibers which comprises coating the fibers with rubber, spraying the rubber coated fibers to form an article, and curing and drying the product.

4. The method of treating fibers which comprises coating the fibers with rubber, spraying the rubber coated fibers on a mold and drying and curing the product.

5. The method of treating fibers which comprises coating the fibers with rubber, spraying the rubber coated fibers on a mold by means of compressed fluid, and drying and curing the product.

6. The method of treating fibers which comprises coating the fibers with rubber, depositing the rubber coated fibers on a mold by means of a fluid carrying agent, and curing the product.

7. The method of treating fibers which comprises coating the fibers with rubber, depositing the coated fibers on a porous mold, and subjecting the fibers to the action of heated gases.

8. The method of treating fibers which comprises coating them with rubber, depositing the coated fibers on a mold, and treating the fibers with rubber curing gases.

9. The method of treating fibers which comprises coating them with rubber, depositing the coated fibers on a mold, and treating the fibers with sulphur dioxide and hydrogen sulphide.

10. The method of treating fibers which comprises coating them with rubber, spraying the fibers on a mold by means of compressed gas, and drying the product.

11. The method of treating fibers which comprises coating them with rubber, spraying the fibers on a foraminous mold by means of compressed air and drying the product.

In witness whereof, I have hereunto signed my name.

WILLIAM G. O'BRIEN.